(Specimens.)

E. KIPPER.
PROCESS OF AND MEANS FOR COATING HANDLES, &c.

No. 333,469. Patented Dec. 29, 1885.

Witnesses,
Robert Emmett
J. A. Rutherford

Inventor.
Emil Kipper.
By James L. Norris.
Atty.

UNITED STATES PATENT OFFICE.

EMIL KIPPER, OF ADAMS, MASSACHUSETTS.

PROCESS OF AND MEANS FOR COATING HANDLES, &c.

SPECIFICATION forming part of Letters Patent No. 333,469, dated December 29, 1885.

Application filed June 18, 1885. Serial No. 169,094. (Specimens.)

*To all whom it may concern:*

Be it known that I, EMIL KIPPER, a subject of the Emperor of Germany, residing at Adams, in the county of Berkshire and State of Massachusetts, have invented new and useful Improvements in Process of and Means for Coating Handles and Analogous Articles with Veneers of Plastic Material, of which the following is a specification.

My invention relates to the manufacture of handles for brushes, whisk-brooms, umbrellas, parasols, canes, tools, whips, and doors by veneering a core of wood or other suitable material with a seamless coating of zylonite or similar plastic compound having pyroxyline for its base.

Figure 1:
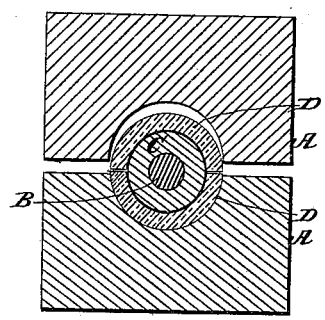
Figure 2:
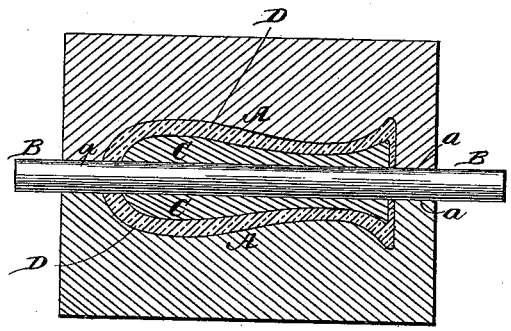
Figure 3:
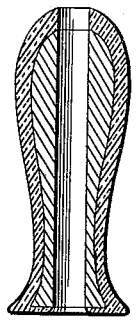
Figure 4:
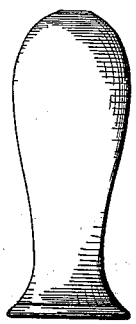
Figure 5:
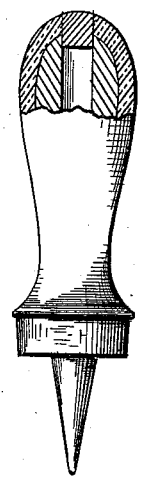
Figure 6:
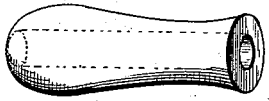

In the annexed drawings, Figure 1 represents a sectional mold or die. Fig. 2 is a longitudinal section of the same, showing removable mandrel, wooden core or body of the article to be coated, with its surrounding plastic coating or veneer. Fig. 3 is a sectional view of a finished handle. Fig. 4 is an elevation of the same. Fig. 5 is an elevation, partly in section, showing finished brush-handle. Fig. 6 is a perspective view of handle.

A shows a sectional molder die of any requisite form to correspond with the contour and design of the article to be veneered.

B is an iron or steel mandrel.

C shows the core or body of the article to be coated, and D shows the plastic coating or veneer.

To cover a handle longitudinally through its center, I first cut to the proper size a piece of zylonite or similar compound, and warm it until it becomes plastic. This is laid in the depression of the lower half of the sectional die or mold. I then pass the mandrel B through the hollow core C, and superimpose mandrel and core upon the piece of zylonite or celluloid previously laid in the mold. Having warmed another suitably-sized piece of zylonite, I lay this upon the core and its mandrel, and carefully adjust thereupon the upper section of the mold, which should be warmed to about 150° Fahrenheit, and the mold, with its charge, is then ready for the press, which should be provided with the means of heating its lower plate with steam. Pressure is now applied gradually until complete union of the two pieces of zylonite or celluloid is effected.

Instead of using two pieces—the one in the lower part of the mold, the other in the upper part—I can use one piece, the edges of which, when wrapped around the core, barely touch each other, and by applying heat and pressure, as described above, a perfect weld will result. I may also introduce the core into a tube previously prepared to a suitable size, and by applying heat and pressure it will adapt itself to the shape of the mold. If the plastic compound has been seasoned, it is desirable that the lower piece of plastic compound should be brushed over with a solvent of zylonite (rectified wood-naphtha will serve) on such portion of the same as may come in contact with the surface of the upper piece of same material; but if what is termed "green stock" be used such application of a solvent is unnecessary.

It will be observed that both sections of the mold A are provided at each end thereof with a suitable shoulder or rest, a, to support the projecting ends of the mandrel. By this arrangement the core is firmly held in position, and the die or mold, when closed, equally distributes the pressure over the surface of the core and its covering of plastic compound.

Prior to my invention green or unseasoned zylonite or celluloid, &c., could not be successfully used for veneering or coating articles, owing to their tendency to shrink irregularly and warp after they were applied, and if molded from a solid mass the expense was objectionable.

While a tubular or hollow core is preferable for many purposes, I do not confine myself to a core with a metal mandrel. In many articles a solid core may be substituted for the tubular or hollow core, with its metallic mandrel, and the ends thereof may be turned so as to fit into the shoulder or rest *a a* of the mold or die, hereinbefore referred to as intended to receive a metallic mandrel. Where the core is solid, as mentioned, the projecting ends constitute a mandrel and serve the purpose of the mandrel B, hereinbefore described.

Articles that have been molded on a hollow core can be closed after molding with an ornamental plug; or a screw-ring can be inserted to fill in the opening left by the mandrel.

The above is an explanation of covering cores with a plastic material when such cores are subjected to a metal die which serves to give the required outside shape to the article.

In order to give shape to the article, another die may be employed, such as described in Patents No. 271,494 and No. 271,495, granted by the United States to J. McClelland January 30, 1883.

By adopting this process it is necessary that the core should have the perfect contours which are desired to be produced on the outside of the finished article, as by this process no flow of the material is produced, which may take place by using the solid die.

What I claim is—

1. The combination of a two-part mold or die, each part provided with shoulders *a a*, with a mandrel and hollow core, substantially as described, and for the purpose set forth.

2. The combination of a two-part mold or die, each part provided with shoulders or rests, and a solid core whose ends are supported in said shoulders or rests, substantially as described, and for the purposes set forth.

3. The process herein described of making handles for various articles, which consists in providing a core with a mandrel projecting from the opposite ends thereof, supporting said core by said mandrel in a die or mold, and covering or inclosing the core with a sheet or sheets or tube of plastic material, substantially as described.

In testimony whereof I affix my signature in presence of two witnesses.

EMIL KIPPER.

Witnesses:
 GEO. M. MOWBRAY,
 S. W. INGALLS.